United States Patent [19]

Chancler et al.

[11] 4,014,645

[45] Mar. 29, 1977

[54] DYEABLE POLYOLEFIN BACKING FOR TUFTED SURFACE COVERINGS

[75] Inventors: Francis X. Chancler, Southampton; Vincent J. Moser, Hatboro, both of Pa.

[73] Assignee: Rohm and Haas Company, Philadelphia, Pa.

[22] Filed: Oct. 8, 1975

[21] Appl. No.: 620,904

[52] U.S. Cl. .................................. 8/17; 8/1 XB; 8/1 R; 28/76 R; 428/95
[51] Int. Cl.² .......................................... D06P 7/00
[58] Field of Search ................ 8/1 XB, 17; 428/95, 428/31

[56] References Cited

UNITED STATES PATENTS

| | | | |
|---|---|---|---|
| 2,131,121 | 9/1938 | Schlack | 8/165 |
| 2,131,146 | 9/1938 | Schlack | 8/177 |
| 2,215,196 | 9/1940 | Schlack | 8/29 |
| 3,439,999 | 4/1969 | Miller | 8/15 |
| 3,605,666 | 9/1971 | Kimnael | 428/95 |
| 3,678,098 | 7/1972 | Lewis et al. | 428/95 |
| 3,694,393 | 9/1972 | Lewis et al. | 428/95 |

FOREIGN PATENTS OR APPLICATIONS

| | | | |
|---|---|---|---|
| 913,701 | 12/1962 | United Kingdom | 8/18 |

*Primary Examiner*—Donald Levy
*Attorney, Agent, or Firm*—Patrick C. Baker

[57] ABSTRACT

The dye receptivity of polyolefin materials, used as backings for tufted surface coverings such as carpets and upholstery fabrics, is improved by coating the polyolefin material with a self-curing polymeric binder containing a quaternary ammonium salt. The backing is thereby easily dyed on-shade with the tufted face yarns so as to hide the backing.

18 Claims, No Drawings

DYEABLE POLYOLEFIN BACKING FOR TUFTED SURFACE COVERINGS

BACKGROUND OF THE INVENTION

This invention relates to polyolefin backing materials for tufted surface coverings such as carpets and upholstery fabrics. In its preferred aspects, the invention relates to woven and nonwoven polyolefin materials to which may be tufted face yarns, and to the resulting surface coverings.

Polyolefin films and woven or nonwoven fabrics are increasingly being used as backing materials in the fabrication of various types of tufted surface coverings such as carpets and upholstery fabrics. For example, it is presently estimated that 65% of the primary backings used in tufted carpets are slit-woven polypropylene, 20% are spun-bonded polypropylene nonwovens, and only 15% is jute. Although at the present time almost all secondary carpet backing is jute, the increased cost of jute and its many undesirable properties as compared with polyolefin material presages replacement with polyolefin. However, despite their many advantages over jute, polyolefin backing materials are notoriously resistant to dyeing. Surface coverings incorporating such backings therefore exhibit "grin-through", the undesirable visibility of the polyolefin backing when the tufted surface covering is creased or bent back upon itself. Grinning is especially pronounced in shag carpeting when there is a mismatch between coloration of the backing and the face yarns.

OBJECTS AND SUMMARY

Accordingly, an object of the invention is to provide a polyolefin backing material which combines in a single coating and process superior binding qualities and improved dye receptivity so that when the coated polyolefin backing is dyed, the backing as well as face yarns tufted into the backing are tightly locked into a unitary whole and the polyolefin backing material will be masked from view. Another object is to provide a process for the coating of surface covering backings having improved efficiency and economy due to low energy requirements for curing of the coating on the polyolefin backing material.

The invention is based on the discovery that a certain class of polymeric coating materials not only provide superior binding properties for polyolefin backing materials but also introduce better dye pickup properties in a controllable manner so that the polyolefin backing material will be dyed on-shade with the face yarns, thereby masking the unsightly appearance of the backing.

The polymeric coatings comprise homopolymers and, preferably, copolymers incorporating a quaternary ammonium group based upon monoethylenic unsaturation and epihalohydrin interaction. Typical of such polymeric materials are the reaction products of (a) a hydrogen acid salt of dimethylaminoethyl methacrylate and epichlorohydrin, and (b) a lower alkyl acrylate. These and other polymeric coatings, and other features and advantages of the invention are more fully described below.

DETAILED DESCRIPTION

The polymeric materials to be applied to the polyolefin backing materials in accordance with the invention are described in U.S. Pat. Nos. 3,678,098 and 3,694,393 to Lewis, Merritt and Emmons, assigned to Rohm and Haas Company. While extended description of the polymers therefore is not required, the following description will summarize the essential characteristics of the polymers and will also point out preferred embodiments.

The polymers of the coatings comprise two groups as follows:

A. homopolymers and copolymers of a quaternary monomer prepared by reacting an epihalohydrin of the formula

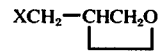

with an amine salt of the formula $H_2C=C(R)C(O)O-A-N(CH_3)_2 \cdot HY$;

B. the reaction product of homopolymers or copolymers of the foregoing amine salts and the epihalohydrin.

In the foregoing structures, R is hydrogen or methyl, X is a halogen atom such as iodine, bromine or chlorine, A is a $(C_2-C_6)$ alkylene group having at least two carbon atoms in a chain between adjoined oxygen and nitrogen atoms or A may be a polyoxyethylene group of the formula $(CH_2CH_2O)_xCH_2CH_2$ wherein $x$ is at least 1, and Y is an anion which promotes water solubility of the amine salt. Typical of such anions are the halogen ions of halogen acids, or the anion of any other acid, such as nitrate, phosphate, acid phosphate, sulfate, bisulfate, methyl sulfate, carboxylate, sulfonate, sulfamate, acetate, formate, oxalate, acrylate, and α-methacryloxyacetate. Preferably, Y is the anion of an acid having an ionization constant, $pK_a$ of 5.0 or less, i.e. a dissociation such that the hydrogen ion concentration is at least $10^{-5}$.

The copolymers of the quaternary monomers of group A or the copolymers of the amine salts to be reacted with epihalohydrin to form the copolymers of group B are formed by reaction with at least one other α,β-monoethylenically unsaturated monomer, particularly the esters of acrylic acid or methacrylic acid with $(C_1-C_{18})$ alcohols, acrylonitrile, methacrylonitrile, acrylamide, methacrylamide, n-methylolacrylamide, N-monoalkyl and N-dialkyl acrylamides and methacrylamides, and other monomers such as set forth in the aforementioned patents.

The extent of improvement of dye pickup by polyolefin materials coated with the polymeric materials is related to the proportion of quaternary ammonium functionality in the polymers and to the quantity ("add-on") of polymer applied to the polyolefin substrate material.

Such proportions and add-on amounts are not critical from the standpoint of increasing the dye receptivity of the polyolefin material and may be selected in accordance with the depth of color desired and ease of processing. For example, dye receptivity will be improved by use of homopolymers and copolymers containing from about 0.1% to about 10% or more by weight of the quaternary ammonium salt at a polymer solids add-on of from about 1% to about 20% by weight of backing material.

The range of color intensities developed upon subsequent dyeing must, of course, be balanced with cost, ease of application and other properties which it is desired to impart along with the improved dye receptivity. For such reasons, certain of the copolymers are preferred, these being copolymers containing about 10–99% by weight of at least one alkyl ester of acrylic or methacrylic acid. By selection of appropriate monomer or monomers of these types, polymer coatings will result not only having improved dye receptivity but also appropriate degrees of film softness, stiffness (modulus) and tensile strength, and binding properties while also providing processing benefits such as avoidance of tufting needle heating. Although dye receptivity may be greater when using polymers containing over 10% by weight of the quaternary ammonium salt, the viscosity is also thereby increased, making application to the backing more difficult. As a general rule, therefore, 1–10% of the ammonium salt is quite sufficient.

In addition, comonomers should be selected which will generally provide a second order transition temperature ($T_{300}$) in the resulting film ranging from −40° C. to +40° C. ($T_{300}$ is the temperature at which a modulus of 300 kg/cm$^2$ is obtained) representing extreme softness introducible by acrylates such as 2-ethylhexyl acrylate or butyl acrylate to the rather extreme stiffness and brittleness introducible by a methacrylate such as methyl methacrylate. It has surprisingly been found that copolymers containing the softer comonomers provide superior tensile strength, as measured on an Instron device (a measure of ease of tufting including needle heating and damage to polyolefin substrate after tufting). Normally, it would have been expected that copolymers containing harder comonomers would avoid such problems. Accordingly, from the standpoints of best balance of properties in the resulting tufted surface covering and manufacturing ease, those copolymers containing 10–99% by weight of at least one lower alkyl acrylate comonomer are preferred, and of such comonomers, ethyl acrylate is preferred at a level of about 92–97% by weight of the copolymer, the balance being the portion of the copolymer containing the quaternary ammonium group.

As indicated, copolymers containing the higher percentages of alkyl acrylates are highly effective in obtaining a superior balance of the properties in the tufted surface covering upon dyeing at a pH of about 6–7, the usual condition in the milder processing (5–10 minutes contact time) encountered in the well-known Kuster's dyeing process. However, when the more vigorous conditions of beck dyeing are involved, such as boiling for about one hour at a pH of about 4–4.5, it is preferred to replace up to about 50% of the lower alkyl acrylate with a comonomer which is protonated at such lower pH. The polymer is thereby readily adapted to such dyeing technique. Any unquaternized $\alpha,\beta$-monoethylenically unsaturated monomer containing a tertiary ammonium group will be suitable for this purpose, such as the dialkylaminoalkyl acrylates and methacrylates of which dimethylaminoethyl methacrylate is preferred. Low proportions of such comonomers usually are quite effective, of the order of about 1–10% by weight of the total copolymer.

Resistance to dry cleaning solvents can also be built into the polymers by replacing some of the alkyl acrylate comonomer with acrylonitrile. About 1–20% by weight, preferably 5–15%, of acrylonitrile based on total polymer weight, will be effective for this purpose. Such resistance is important when the polyolefin backing is a nonwoven material.

The polymeric coatings are conveniently prepared as polymer emulsions of about 20–70% polymer solids. The solids content of choice is related to the proportion of quaternized ammonium salt in the polymer and to processing conditions including viscosity and the form and rate of application and may be varied accordingly. The emulsions may be applied to the backing materials in any of the conventional manners known in the art. These include padding, spraying, roll coating, knife coating and the like. In the case of woven or nonwoven polyolefin substrate materials, a polymer solids content of about 40–60% for polymers containing about 1–10% of quaternized ammonium salt is preferred to maintain good storage stability of the polymer emulsions and application rate.

Emulsion polymer particle size can also be regulated in known ways to promote efficient application and formulation stability. Sufficient polymer should be applied to give a uniform coating on the polyolefin substrate. The polymer emulsion formulations may contain any of the ingredients conventionally used in emulsion coatings such as dispersants (nonionic, anionic or mixtures), polymerization initiators and accelerators. These and other aspects of forming polymeric emulsions from acrylic monomers are well-known, as described, for example, in U.S. Pat. Nos. 2,754,280 and 2,795,564. Of course, polymer solids and add-on levels may also be varied in accordance with the particular form of polyolefin substrate being coated. Higher solids and/or add-on levels may be required for woven or nonwoven backings than for films.

Any form of polyolefin substrate material which can be tufted to form a surface covering can be used, including films and various woven and nonwoven forms, such as woven slit film and spun-bonded polyolefins. The polyolefins include any such materials used as surface covering backings, such as polyethylene, polypropylene and other homopolymers, and copolymers of olefins containing two to six carbon atoms, wherein such copolymers contain at least 85% by weight of such olefin units, as defined by the Textile Fiber Products Identification Act (Public Law 85-897). Woven slit films or spun-bonded films of polypropylene are preferred. The face yarns may be any type of yarn conventionally used in the tufting of polyolefin substrates to form surface coverings, such as nylons, acrylics, polyesters and other synthetic yarns including blends of synthetics alone or with natural fibers.

Any dyes of the direct and acid dye classes, such as the sulfonated dyes, may be used for the dyeing. The polyolefin backing material may be dyed separately from the face yarns or, more usually, the face yarns and polyolefin substrate will be dyed simultaneously after the coating and tufting steps. The dye levels are those conventionally employed in the dyeing of polyolefin surface coverings, and any dyeing technique may be used including Kuster dyeing, beck dyeing and printing techniques. The polymeric coating is applied at least to that side of the polyolefin substrate from which the face yarns will project after tufting, but it has also been found useful to back-coat the polyolefin substrate before or after tufting to more tightly lock in the face yarns to the substrate and, in the case of woven or nonwoven backings, to also stabilize the backing material against distortion and fraying. If a secondary backing material is used, it also may be coated and dyed in accordance with the invention, if desired.

One of the outstanding advantages of the invention is that no separate curing step is required to achieve resistance to a dye cycle. The polymeric coatings are self-curing upon elimination of water, which elimination can be effected by permitting the coated substrate to dry under ambient room conditions or the curing can be accelerated by conventional drying techniques. The high temperature levels usually required for curing of other polymeric binders can be avoided and therefore the problem of possible damage to the substrate when, for example, the temperature approaches the melting point of the polyolefin material.

It has been found, further, that the good substrate masking properties achieved by the improved dyeability permit reduction in face yarn density and high speed dyeing with different colors. In the past, masking of the substrate has required high surface yarn density or the needlepunching of another yarn layer into the backing. The expense of such approaches can now be avoided. The invention thus opens up polyolefin backings to use in tufted upholstery fabrics since, heretofore, primary backings for such uses have been limited to backings of rayon or other fibers which accept dyes naturally.

The following examples will serve as further illustration of the invention but are not necessarily limitative except as set forth in the claims. All parts and percentages are by weight unless otherwise indicated.

EXAMPLE 1 a. Preparation of Quaternary Monomer

A flask equipped for stirring, automatic temperature control, addition, and vacuum distillation is charged with 470 grams of deionized water and 89.4 grams of concentrated (70%) nitric acid. A supply of dimethylaminoethyl methacrylate (168.8 grams) is gradually added and the temperature maintained at less than 35° C. Epichlorohydrin (92.5 grams) is added all at once and the temperature is maintained at 50° C. for 3 hours. Finally, at 50–100 mm Hg and 50° C., 43 grams of water containing unreacted epichlorohydrin is distilled off and the pH of the batch is adjusted to 5.0 with nitric acid.

b. Preparation of Polymer Emulsion

A flask equipped for stirring, cooling, addition and condensing was charged with an emulsion consisting of 1042.4 grams deionized water, 51.4 grams of a 70% solution of an t-octylphenoxy polyethoxyethanol surfactant, 72.0 grams of a 0.1% solution of $FeSO_4 \cdot 7 H_2O$, 19.8 grams of a 1% solution of "Versene" chelating agent, 360 grams of an ethyl acrylate "seed", and 2.6 grams of a 55% solution of diisopropyl benzene hydroperoxide. After sparging with nitrogen, 0.72 grams of "Formopon" sodium sulfoxylate formaldehyde and 51.4 grams of a 70% solution of the same surfactant are added. An emulsion of 1386 grams of ethyl acrylate, 181.2 grams of the quaternary monomer solution prepared in Part (a), 10.5 grams of a 50% solution of diisopropylbenzene hydroperoxide, 51.4 grams of a 70% solution of t-octylphenoxy polyethoxyethanol and 450 grams of deionized water is added over a period of 3 hours. Concurrently, a solution of 2.88 grams of "Formopon" in 219.4 grams of deionized water is added while maintaining the temperature at 60° C.

EXAMPLE 2

The emulsion prepared in Example 1b was formulated for coating onto a fabric woven from polypropylene slit film. Thus 400 grams of emulsion were mixed with 10 grams of $NaHCO_3$ catalyst and a slurry of 4 grams of hydroxyethyl cellulose thickener in 20 grams of water. The thickened, catalyzed emulsion was spread on the fabric with a coating knife set at 0.076 mm (0.003 in.) above the fabric. The fabric was then allowed to dry under ambient room conditions and baked for 3 min. at 115° C. in a circulating air oven.

This polypropylene fabric, containing about 67.7 g/m$^2$ (2 oz/yd$^2$) of coating, was then used as a substrate for a tufted nylon shag carpet. The weight of nylon yarn used was 406 g/m$^2$ (12 oz/yd$^2$), the tufts were 25 mm (1 in.) high, 9.5 mm (3/8 in.) apart in the tufting direction and 6 mm (¼ in.) apart in the cross direction. During tufting, the coated side of the fabric was oriented so that the coating would be on the face of the carpet. A similar control shag carpet was made with uncoated polypropylene fabric.

Pieces of the coated and uncoated carpets were treated with 2% C.I. (Color Index) Acid Red 37 dye and 2% $K_2HPO_4$, based on the weight of the carpet, in a wash wheel for 1 hr. at 95°–100° C. (203°–212° F.). Upon removal from the wheel and drying, the carpet made with the coated polypropylene fabric looked much more luxurious than the control carpet because the coated fabric had dyed on-shade with the nylon. In the control carpet, the unsightly undyed polypropylene fabric could be seen through the tufts of dyed nylon. Both carpets were thereafter finished by laminating them with jute secondary backing fabric and a conventional latex adhesive.

EXAMPLE 3

Two other pairs of the coated and control carpets prepared in Example 2 were treated as in Example 2 but with C.I. Acid Blue 122 and C.I. Acid Yellow 17 dye, respectively. These also showed the same effect as described in Example 2.

EXAMPLE 4

A polypropylene nonwoven (spun-bonded) fabric was coated with a mixture containing 100 grams of the emulsion of Example 1b, 2.3 g. $NaHCO_3$, 8 grams hydroxyethyl cellulose and 289.7 grams water. A floating knife type of coating machine was used. Upon drying the fabric 2 min. at 115° C. (240° F), it was found that a coating of 16.9 g/m$^2$ (0.5 oz/yd$^2$) had been deposited.

The coated fabric was tufted with rayon yarn to make an upholstery fabric. The tufted construction of this fabric was 5 rows/cm (13 rows/in) and 7.1 stitches/cm (18 stitches/in) with a pile height of 3.2 mm (⅛ in). The coating was oriented so as to appear in the face of the tufted fabric. A similar piece of tufted upholstery fabric was made with uncoated polypropylene nonwoven fabric.

Pieces of tufted fabrics made with both the coated and the uncoated control polypropylene fabrics were backcoated to maintain the integrity of the tufts. The backcoating formulation consisted of (1) 300 grams of the emulsion of Example 1a; (2) 300 grams of water; (3) 150 grams of a slurry consisting of 70% $CaCO_3$ filler, 29.8% water and 0.2% methylene bis naphthalene sulfonate dispersing agent; (4) 7 grams $NaHCO_3$ and (5) 4 grams hydroxyethyl cellulose slurried in 20 grams water. A No. 24 wire wound coating applicator rod from R. D. Specialty Co. was used for coating. After drying the coated fabric at 115° C. (240° F) and baking 3 min. at 126° C (260° F), the fabrics were found to contain coatings weighing 84.6 g/m$^2$ (2.5 oz/yd$^2$).

Pieces of the tufted fabrics made from both face-coated and control-coated fabrics were treated in 1 kg. (2.2 lb) size paddle dyeing machine with 0.5% C.I. Direct Red 81 dye and 0.5% NaCl, both based on the weight of the fabric. Upon drying the fabric, the face coated polypropylene tufting substrate was found to be dyed on shade with the rayon yarn. On the control tufting substrate, without the face coating, the undyed fabric showed through the tufts, this effect being known as "grinning".

EXAMPLE 5

Woven polypropylene slit film fabric prepared essentially as in Example 2 was padded with a mixture of 240 grams of the emulsion polymer prepared in Example 1b, 5.5 grams of $NaHCO_3$, 6 grams of hydroxyethyl cellulose and 548.5 grams water. The treated fabric was mounted on a pin frame and dried for 3 min. at 115° C. The amount of polymer applied was found to be 10% of the weight of the fabric.

Dyed shag carpets were prepared with the above treated fabric as well as with untreated fabric essentially as described in Example 2. The treatment helped maintain the integrity of the fabric during the tufting. The treated polypropylene fabric dyed on shade with the nylon face yarns to hide the unsightly polypropylene.

EXAMPLE 6

A polymer emulsion essentially the same as that of Example 1b was prepared except the level of quaternary monomer was doubled to 362.4 grams and the ethyl acrylate was reduced by 181.2 grams. Shag carpet was prepared as in Example 5 and a deeper dyeing of the treated polypropylene was obtained.

EXAMPLE 7

A polymer emulsion essentially the same as that of Example 1b was made but 181.2 grams of ethyl acrylate were replaced by dimethylaminoethyl methacrylate. Shag carpet was prepared as in Example 5 and a dyeing as deep as that obtained in Example 6 was obtained.

EXAMPLES 8–10

Other copolymers were prepared in polymer emulsion form and it was shown that they improved the dye receptivity and other properties of polypropylene backing materials such as woven slit polypropylene film, essentially as described in Examples 1 and 2 above.

These copolymers and the solids contents of the emulsion coating compositions containing them were as follows, where "QM" is the quaternary ammonium salt monomer of Example 1a:

| Ex. No. | Monomers | Proportions | Solids |
|---|---|---|---|
| 8 | ethyl acrylate/QM | 97/3 | 60.5% |
| 9 | ethyl acrylate/acrylonitrile/QM | 87/10/3 | 46.5% |
| 10 | ethyl acrylate/acrylonitrile/QM | 87/10/3 | 60% |

What is claimed is:

1. As a surface covering, a dyed carpet or upholstery fabric comprising a polyolefin backing material having a polymeric coating thereon, and face yarns tufted to said backing, said coating being selected from:

A. homopolymers and copolymers of a quaternary monomer prepared by reacting an epihalohydrin of the formula

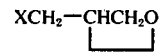

with an amine salt of the formula $H_2C=C(R)C(O)O-A-N(CH_3)_2 \cdot HY$; and

B. the reaction product of homopolymers or copolymers of said amine salt and said epihalohydrin; wherein R is hydrogen or methyl, X is iodine, bromine or chlorine, A is a ($C_2-C_6$) alkylene group having at least two carbon atoms in a chain between adjoined O and N atoms or A may be a polyoxyethylene group of the formula $(CH_2CH_2O)_xCH_2CH_2$ wherein $x$ is at least 1, and Y is an anion.

2. A surface covering as in claim 1 wherein said backing material is selected from woven and nonwoven polyethylene or polypropylene.

3. A surface covering as in claim 1 wherein said backing material is a fabric of slit polypropylene film and said film is dyed after application of said polymeric coating and after tufting.

4. A surface covering as in claim 1 wherein said backing material is a nonwoven polypropylene fabric and said fabric of non-woven polypropylene is dyed after application of said coating and after tufting.

5. A surface covering as in claim 1 wherein said polymeric coating is a copolymer of said quaternary monomer and at least one other $\alpha,\beta$-monoethylenically unsaturated monomer.

6. A surface covering as in claim 5 wherein said other monomer is a lower alkyl ester of acrylic or methacrylic acid.

7. A surface covering as in claim 1 wherein said polymeric coating is a copolymer of a quaternary monomer prepared by reacting (a) a hydrogen acid salt of dimethylaminoethyl methacrylate and epichlorohydrin, and (b) a ($C_1-C_4$) alkyl acrylate, a mixture of a ($C_1-C_4$)alkyl acrylate and acrylonitrile, or a mixture of a ($C_1-C_4$) alkyl acrylate and dimethylaminoethyl methacrylate, in proportions of 1–10 wt.% of said quaternary monomer to 99–90 wt.% of said alkyl acrylate or mixtures.

8. A surface covering as in claim 7 wherein said alkyl acrylate is ethyl acrylate.

9. A surface covering as in claim 7 wherein the amount of said ethyl acrylate is 92–95 wt.%.

10. A surface covering as in claim 7 wherein said alkyl acrylate is ethyl acrylate, and said mixture with dimethylaminoethyl methacrylate contains up to 50% by weight of said methacrylate.

11. A surface covering as in claim 1 wherein the amount of polymeric coating on the polyolefin backing is about 1–20% by weight of said backing.

12. A process for preparing a dyed carpet or upholstery fabric which comprises coating a polyolefin backing material with a polymer composition selected from A. homopolymers and copolymers of a quaternary monomer prepared by reacting an epihalohydrin of the formula

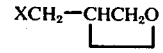

with an amine salt of the formula $H_2C=C(R)C(O)O-A-N(CH_3)_2 \cdot HY$; and

B. the reaction product of homopolymers or copolymers of said amine salt and said epihalohydrin;

wherein R is hydrogen or methyl, X is iodine, bromine or chlorine, A is a $(C_2-C_6)$ alkylene group having at least two carbon atoms in a chain between adjoined O and N atoms or A may be a polyoxyethylene group of the formula $(CH_2CH_2O)_xCH_2CH_2$ wherein $x$ is at least 1, and Y is an anion and dyeing and tufting the resulting coated backing material.

13. A process as in claim 12 wherein said backing is selected from woven and nonwoven polyethylene or polypropylene.

14. A process as in claim 12 wherein said backing material is a fabric of slit polypropylene film and said fabric of polypropylene film is dyed after application of said polymeric coating and after tufting.

15. A process as in claim 12 wherein said backing material is a nonwoven polypropylene fabric and said fabric of non-woven polypropylene is dyed after application of said coating and after tufting.

16. A process as in claim 12 wherein said polymeric coating is a copolymer of said quaternary monomer and at least one other $\alpha,\beta$-monoethylenically unsaturated monomer.

17. A process as in claim 12 wherein said polymeric coating is a copolymer of said quaternary monomer and a $(C_1-C_4)$alkyl acrylate, a mixture of a $(C_1-C_4)$alkyl acrylate and acrylonitrile, or a mixture of a $(C_1-C_4)$alkyl acrylate and dimethylaminoethyl methacrylate.

18. A process as in claim 17 wherein said $(C_1-C_4)$alkyl acrylate is ethyl acrylate.

* * * * *